Oct. 25, 1932.  D. LALLI  1,884,928

AUTOMOBILE PUMP

Original Filed June 16, 1930

Domonic Lalli
INVENTOR.

C. Harpman
ATTORNEY

Patented Oct. 25, 1932

1,884,928

UNITED STATES PATENT OFFICE

DOMONIC LALLI, OF YOUNGSTOWN, OHIO

AUTOMOBILE PUMP

Application filed June 16, 1930, Serial No. 461,275. Renewed September 14, 1932.

This invention relates to pumps.

The principal object of this device is to provide an air pump to be used in pumping up automobile tires.

A further object of the invention is to provide an air pump that may be attached and detached to and from an automobile.

A still further object of the invention is to provide an air pump that is energized by power taken from the engine in the automobile.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
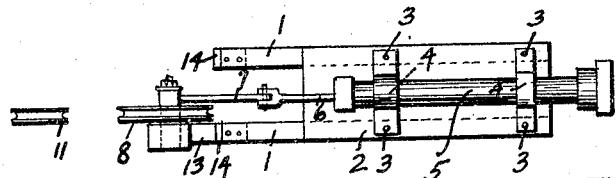
Figure 1 is a top plan view of the device.
Figure 2:
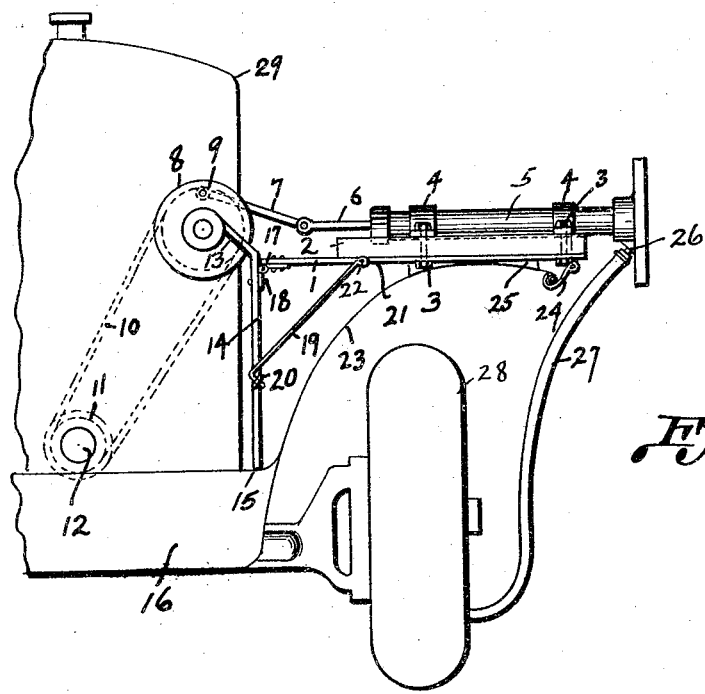
Figure 2 is a side elevation of the device showing the same attached to an automobile.

By referring to the drawing it will be seen that I have provided horizontal frame members 1 to which is attached a support block 2. This support block 2 is held in position in relation to the horizontal frame members 1 by means of bolts 3 which pass through clamp members 4 and through the support block 2 and horizontal frame members 1. It will be seen that the clamp members 4 hold a pump 5 in position. This pump 5 is provided with an ordinary piston rod 6 which is connected at its outer end to a link 7. An outer end of the link 7 is secured to a pulley wheel 8 at a point 9 near outer circumference of the pulley wheel 8. This pulley wheel 8 is actuated by means of a belt 10 which receives its power by functioning with a pulley wheel 11 secured to an ordinary engine shaft 12.

The pulley wheel 8 is supported by means of an arm 13 which is a continuation of support legs 14. The support legs 14 rest upon a bottom portion 15 of an automobile housing part 16. These support legs are hinged at a point 17 by means of hinges 18 so that the same may be folded up when not in use by releasing a brace rod 19 which functions in a keeper eye 20 secured to a support leg 14 and pivoted at a point 21 by means of a pivot pin 22. In order to keep the device from scratching or marring a fender 23 to which an outer portion of the device is attached by means of a hook 24, there is provided a rubber cushion member 25 which is secured underneath the horizontal frame members 1.

It will be seen by referring to the drawing that there is an air outlet 26 to which is attached an air hose 27 which may be of any desirable length and in order to reach any of the tires 28 of an automobile 29.

What I claim is:—

In a device of the class described, horizontal frame members, a support block, a pump secured to said support block, a pair of support legs hinged to said horizontal frame members, an arm held by one of said support legs, a brace rod functioning between one of said support legs and the horizontal frame member, a hook functioning with an outer portion of the device and with an outer portion of a fender, attached to said arm a pulley wheel, a link secured to said pulley wheel and to a piston rod of said pump, means for actuating said pump, substantially as described for the purpose set forth.

In testimony whereof I affix my signature.

DOMONIC LALLI.